United States Patent
McElvain

(10) Patent No.: US 9,479,680 B2
(45) Date of Patent: Oct. 25, 2016

(54) TWO-DIMENSIONAL COLOR TRANSFORMATIONS FOR WIDE GAMUT WORKFLOWS IN DIGITAL CAMERAS

(71) Applicant: DOLBY LABORATORIES LICENSING CORPORATION, San Francisco, CA (US)

(72) Inventor: Jon S. McElvain, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 15/030,534

(22) PCT Filed: Oct. 27, 2014

(86) PCT No.: PCT/US2014/062366
§ 371 (c)(1),
(2) Date: Apr. 19, 2016

(87) PCT Pub. No.: WO2015/065890
PCT Pub. Date: May 7, 2015

(65) Prior Publication Data
US 2016/0261772 A1    Sep. 8, 2016

Related U.S. Application Data

(60) Provisional application No. 61/896,595, filed on Oct. 28, 2013.

(51) Int. Cl.
*G06K 9/00* (2006.01)
*H04N 1/60* (2006.01)
(Continued)

(52) U.S. Cl.
CPC ............ *H04N 1/6008* (2013.01); *G06T 5/007* (2013.01); *H04N 1/6058* (2013.01); *H04N 9/67* (2013.01)

(58) Field of Classification Search
CPC ............... G06T 2207/10024; G06T 7/408; G06T 5/007; H04N 17/002; H04N 17/02; H04N 1/60; H04N 9/735; H04N 9/045; H04N 9/67; H04N 1/6008; H04N 1/6058
See application file for complete search history.

(56) References Cited

U.S. PATENT DOCUMENTS 5,149,960 A    9/1992    Dunne
5,668,596 A    9/1997    Vogel
(Continued)

FOREIGN PATENT DOCUMENTS

JP    H06-296284    10/1994
JP    2011-223452    11/2011
WO    2013/101639    7/2013

OTHER PUBLICATIONS

Finlayson, G.D. et al "White-point Preserving Color Correction" The Fifth Color Imaging Conference: Color Science, pp. 258-261, 1997.

(Continued)

*Primary Examiner* — Phuoc Tran

(57) ABSTRACT

In a digital camera system, traditional input color transformations of raw data using a 3×3 matrix are replaced by two-dimensional lookup (2-D LUTs) tables that better approximate spectral reflectance characteristics. Chromaticity-like signals and an input scale factor are generated in response to raw sensor output values. The chromaticity signals and the input scale factor are mapped via 2-D LUTs into preliminary output signals and an output scaling factor. A final set of output color signals is generated in response to the preliminary output signals and the output scale factor. The 2-D LUTs are designed in response to spectral response curves generated on both the input and output side of the color transformation.

18 Claims, 6 Drawing Sheets

(51) Int. Cl.
*G06T 5/00* (2006.01)
*H04N 9/67* (2006.01)

(56) References Cited

U.S. PATENT DOCUMENTS

| | | | | |
|---|---|---|---|---|
| 7,436,996 | B2* | 10/2008 | Ben-Chorin | G09G 5/02 345/590 |
| 8,929,654 | B2 | 1/2015 | Gish | |
| 8,947,549 | B2 | 2/2015 | Gish | |
| 2002/0060688 | A1 | 5/2002 | Mizumoto | |
| 2010/0097405 | A1* | 4/2010 | Guo | G09G 5/02 345/690 |
| 2010/0103200 | A1* | 4/2010 | Langendijk | G09G 5/02 345/690 |
| 2014/0022410 | A1 | 1/2014 | Gish | |

OTHER PUBLICATIONS

SMPTE ST 2065-4:2012, "Academy Color Encoding Specification" and SMPTE ST 2065-4:2013.
Adobe: Digital Negative (DNG)Specification, version 1.3.0.0, Jun. 2009.
Luther, Robert, "Aus dem Gebiet der Farbreizmetrik" (on Color Stimulus Metris) pp. 540-558, 1927.
Hubel, P.M. et al "Matrix Calculations for Digital Photography" The Fifth Color Imaging Conference, pp. 105-111, 1997.
Andreadis I. et al "A New ASIC for Real-Time Linear Color Space Transforms" Real-Time Imaging, Academic Press Limited, GB, vol. 1, No. 5, Nov. 1, 1995, pp. 373-379.

* cited by examiner

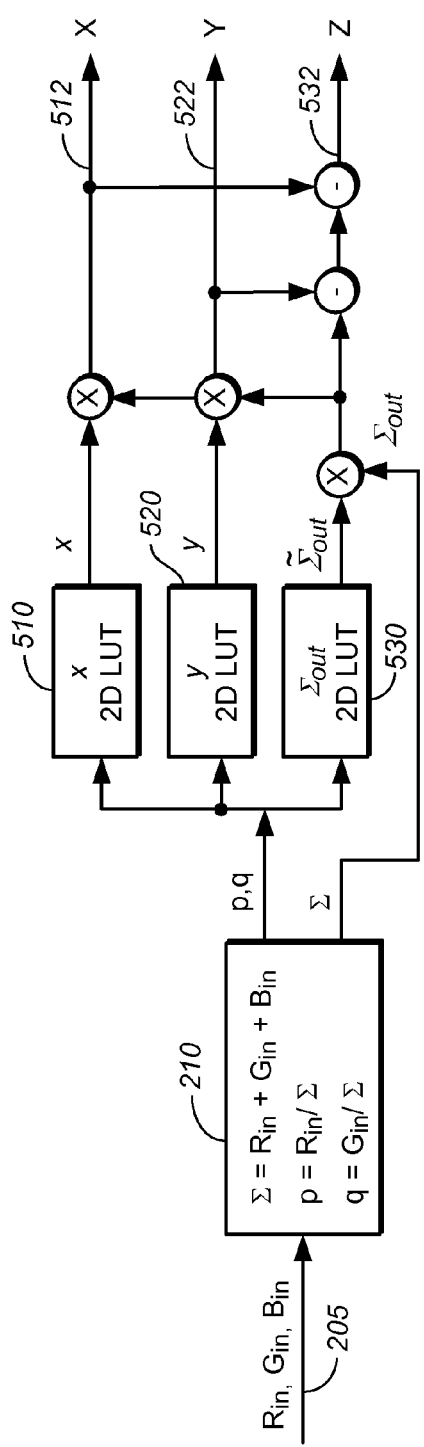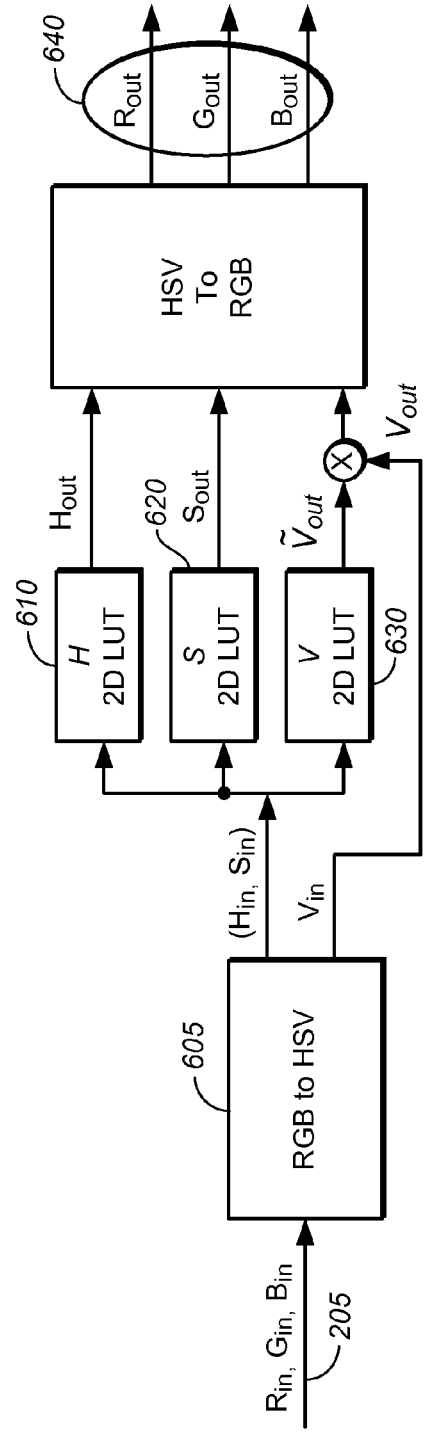

TWO-DIMENSIONAL COLOR TRANSFORMATIONS FOR WIDE GAMUT WORKFLOWS IN DIGITAL CAMERAS

CROSS REFERENCE TO RELATED APPLICATIONS

This application claims priority from U.S. provisional patent application Ser. No. 61/896,595 filed on 28 Oct. 2013. The present application is related to U.S. patent application Ser. No. 14/039,415, titled "Spectral Synthesis for Image Capture Device Processing," filed on Sep. 27, 2013, which is incorporated herein by reference in its entirety.

TECHNOLOGY

The present invention relates to color processing for image capture devices. More particularly, an embodiment of the present invention relates to processing methods to achieve accurate color output from image capture devices.

BACKGROUND

As used herein, the phrases "spectral synthesis" and "spectral synthesis for image capture device processing" may relate to processing methods that may be performed or computed to achieve accurate color output, e.g., from image capture devices. Tristimulus color processing models, such as RGB (red, green, blue), are commonplace. While RGB and other tristimulus models suffice for color identification, matching, and classification, such models may be inherently limited in relation to color processing. By its nature, light comprises a spectrum of electromagnetic energy, which generally cannot be represented completely by, for instance, a red, a green, and a blue color value. With RGB based information as well as tristimulus values corresponding to cone cells receptive to short, medium, and long wavelength light (e.g., blue, green, and red), the human visual system (HVS) attempts to infer an original, natural stimulus.

Processing inside an image capture device generally involves a 3×3 matrix that transforms sensor outputs into a color space of an output image. Results of applying this matrix transformation generally do not reproduce what would be perceived by human eyes unless spectral sensitivities of the image capture device's sensors can be represented as a linear combination of the HVS color matching functions. In many cases, magnitude of these errors in the resulting colors is not inconsequential. As appreciated by the inventor here, improved techniques for input color transforms in digital capture devices are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 5 depicts a method for utilizing 2-D color transformations from camera native values to CIE 1931 XYZ according to an example embodiment of the present invention;

FIG. 6 depicts 2-D color transformations using opponent color indexing according to an example embodiment of the present invention;

DESCRIPTION OF EXAMPLE EMBODIMENTS

Figure 1:
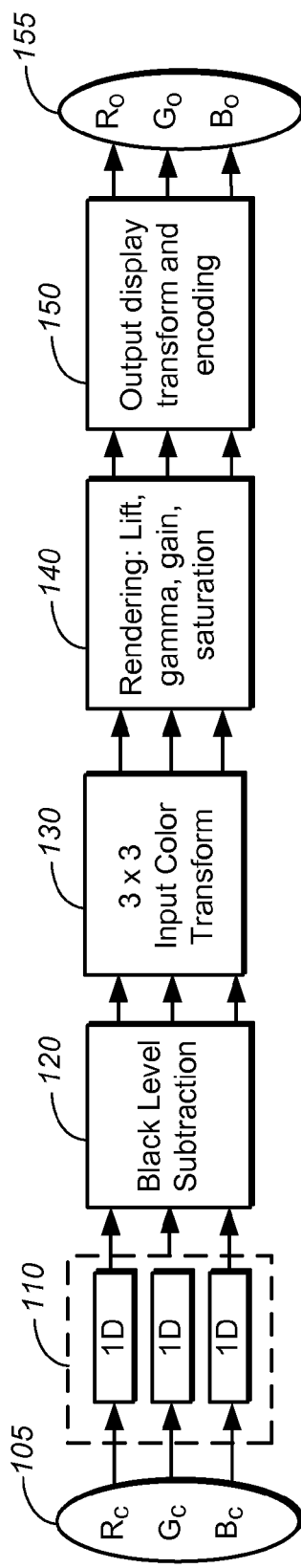
FIG. 1, depicts an example signal processing pipeline for a digital camera system.

Efficient input color transformations using two-dimensional transforms for camera color correction are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to color transformations using two-dimensional transforms for camera color correction. In a digital camera system, traditional input color transformations of raw data using a 3×3 matrix are replaced by two-dimensional lookup (2-D LUTs) tables that better approximate spectral reflectance characteristics and improve color accuracy. Chromaticity-like signals and an input scale factor are generated in response to raw sensor output values. The chromaticity signals and the input scale factor are mapped via 2-D LUTs into preliminary output signals and an output scaling factor. A final set of output color signals is generated in response to the preliminary output signals and the output scale factor. The 2-D LUTs are designed by utilizing spectral response curves generated on both the input and output side of the color transformation.

In an example embodiment, 2D input color transforms are applied to raw RGB camera data to generate CIE XYZ data, where the input scale factor comprises the sum of the raw sensor camera values and the preliminary output signals comprise CIE x and y signals, in addition to an output scale factor.

In another embodiment, 2D input color transformations are applied to input RGB data to generate output RGB values, wherein the input scale factor comprises V values of the input camera data in the HSV color space and the chromaticity signals comprise H and S values of the input data in the HSV color space.

Camera Signal Processing Pipeline

Introduction

Recently, several factors have contributed to wider adoption of digital capture systems in the professional environment, for example in cinematic and episodic productions. Among these include improved noise performance, extended dynamic range capability, and importantly the creation of cost-effective digital workflow ecosystems. As productions continue to migrate toward digital, lower cost camera systems have been introduced, giving many small to medium budget productions access to high quality content creation. For example, the Canon C500, the RED Epic, the ARRI Alexa, and the Sony F55/F65 have both found widespread use, and have produced imagery with quality that rivals that of modern cinematic film.

In a typical digital camera system, in single sensor designs, a scene is imaged through the optical system onto the sensor. A color filter array (CFA) is patterned onto the sensor, and in the case of a Bayer design, it produces individual pixels with either a red, green, or blue response. With this CFA design, the spatial sampling of the green pixels is twice that of the red or blue channels, and to produce separate red, green, and blue images with the full sensor pixel count, various demosaicing algorithms are employed. For three chip sensor configurations (typically found in broadcast camera systems), dichroic mirrors in conjunction with red, green, and blue trimming filters produce the full resolution RGB channels without the need for demosaicing.

Analog RGB signals, initially in the form of electrons in the well of the photodiode associated with each pixel, are formed by taking the projection of the focal plane spectral power distribution $L(\lambda)$ and the RGB spectral sensitivity functions $\bar{r}(\lambda)$, $\bar{g}(\lambda)$, $\bar{b}(\lambda)$ over all wavelengths:

$$R_{in} = \int_0^\infty L(\lambda)\bar{r}(\lambda)d\lambda + n_R$$

$$G_{in} = \int_0^\infty L(\lambda)\bar{g}(\lambda)d\lambda + n_G$$

$$B_{in} = \int_0^\infty L(\lambda)\bar{b}(\lambda)d\lambda + n_B \quad (1)$$

where the terms $n_R$, $n_G$, and $n_B$, refer to the signal-dependent electronic noise generated in the photosite wells. These electrons are converted to analog current or voltage signals during image readout, and subsequently digitized via an analog to digital conversion stage. The digital values produced at this point are typically designated as "native raw", to reflect the fact that no color processing has been applied to the RGB signals.

FIG. 1 depicts an example color signal processing pipeline that involves conversion of these native raw pixel values (105) into pleasing images on the destination display device. Various elements of the pipeline may occur in the camera firmware or offline using a color grading system operated by a colorist. Often the pipeline can be separated into two distinct stages: a) transformation of the native RGB signals into a space with defined colorimetry such as XYZ (e.g., one-dimensional linearization (110), black level subtraction (120), and input color transform (130)); and b) rendering in this color space to eventually produce the final imagery (e.g., 140, and 150).

Of special interest is the processing for the input color transformations (130). Accuracy at this stage is very important, since color errors introduced here, unless corrected, will propagate through the whole system pipeline. The most common method of input color transforms involves the use of 3×3 matrices, as these are simple to implement both in hardware and software. However, for transformations into XYZ or the "*SMPTE ST 2065-1, Academy Color Encoding Specification (ACES),*" (2012) specification, a camera system that strictly satisfies the Luther-Ives condition (Ref. [2]) does not exist. As depicted in equation (1), the source and destination signals are formed via two separate projections from a Hilbert space, and their relationship is ultimately determined by the power spectral distribution of the incoming light at each pixel. Thus the 3×3 matrix is an approximation at best, and is typically determined using regression methods.

Other common approaches employ spectral reflectance databases in conjunction with knowledge of the camera spectral response characteristics (Ref. [3-4]). From these data, a set of camera native R, G, B signals can be computed, and likewise for the destination space (e.g. XYZ or ACES). A variety of regression methods can be used to compute the matrix coefficients, but the most common approaches impose white point preservation as a constraint to the regression problem.

Color Transforms Based on 2D LUTs

As discussed, 3×3 matrices offer low-complexity solutions for color transforms from camera native to the working space, but may suffer from a reduction in accuracy, particularly for more saturated colors. Alternatively, 3D look-up tables (LUTs) provide the ability to map between input and output Hilbert space projections in a nonlinear fashion, but they come at the cost of higher complexity and have the potential of introducing quantization artifacts due to system memory constraints. The polynomial methods are capable of substantial accuracy improvements over the 3×3 matrices, but at the cost of higher computational complexity during pixel processing.

In U.S. patent application Ser. No. 14/039,415, titled "Spectral Synthesis for Image Capture," filed on Sep. 27, 2013, to be referred from now on as the '415 application, which is incorporated herein by reference in its entirety, an alternative approach was proposed that requires a memory footprint comparable to the 3D LUT but carries a relatively low complexity during pixel processing. An example embodiment of the proposed architecture is depicted in FIG. 2.

Figure 2:
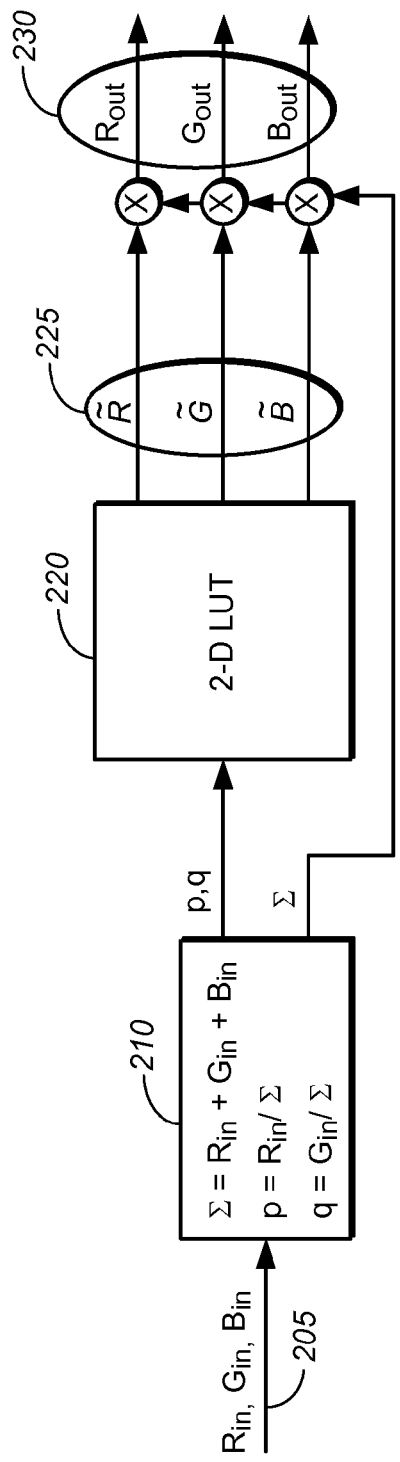
FIG. 2 depicts a color transformation pipeline using two-dimensional operations.

As depicted in FIG. 2, given input native camera RGB signals (205), a scale factor ($\Sigma$) and chromaticity-like signals (p, q) are computed (e.g., in 210). The (p, q) values are used to index into a 2D lookup table (LUT) (220), from which intermediate output values ($\tilde{R}$, $\tilde{G}$, $\tilde{B}$) (225) are determined via interpolation. The final output RGB values (230) are determined by multiplying ($\tilde{R}$, $\tilde{G}$, $\tilde{B}$) by the input scale factor $\Sigma$. In some embodiments, 2D LUT (220) may be implemented using three separate 2D LUTs, one for each $\tilde{R}$, $\tilde{G}$, $\tilde{B}$ output.

The 2D LUT nodes must be populated with the appropriate scaling, and should carry the following ratios:

$$\tilde{R}_{LUT}(p_i, q_j) = \frac{R_{out}(p_i, q_j)}{\sum_{in}(p_i, q_j)} \quad (2)$$

$$\tilde{G}_{LUT}(p_i, q_j) = \frac{G_{out}(p_i, q_j)}{\sum_{in}(p_i, q_j)},$$

$$\tilde{B}_{LUT}(p_i, q_j) = \frac{B_{out}(p_i, q_j)}{\sum_{in}(p_i, q_j)}$$

where ($p_i$, $q_j$) represent the LUT node coordinates. Assuming the LUT is well-built, it is clear that multiplication between the LUT output and E should produce reasonable approximations to the actual output RGB values.

The 2D lookup table (220) can be populated using reflectance data, pure functional representations, or a combination of both. One method could involve the use of specific spectral models to connect the colorimetry of the input and output RGB signals. For example, as described in the '415 application, one could use a rectangular spectral representation, such that there is a mostly one-to-one mapping between LUT coordinates $(p_i, q_j)$ and the wavelengths of the rectangular model $(\lambda_0, \lambda_1)$. Assuming one is operating in the band-pass region, the R channel LUT nodes would be constructed using the following ratio of integrals:

$$\tilde{R}_{LUT}(p_i, q_j) = \int_{\lambda_0(p_i, q_j)}^{\lambda_1(p_i, q_j)} I(\lambda) \bar{r}_{out}(\lambda)$$

$$d\lambda \Bigg/ \left[ \int_{\lambda_0(p_i, q_j)}^{\lambda_1(p_i, q_j)} I(\lambda) \bar{r}_{in}(\lambda) d\lambda + \int_{\lambda_0(p_i, q_j)}^{\lambda_1(p_i, q_j)} I(\lambda) \bar{g}_{in}(\lambda) d\lambda + \int_{\lambda_0(p_i, q_j)}^{\lambda_1(p_i, q_j)} I(\lambda) \bar{b}_{in}(\lambda) d\lambda \right],$$

where $\bar{r}(\lambda)$, $\bar{g}(\lambda)$, $\bar{b}(\lambda)$ refer to the spectral sensitivity functions for the R, G, and B channels respectively; $I(\lambda)$ is the illuminant, which may be equal energy (spectrally flat). The relationship between (p, q) and $(\lambda_0, \lambda_1)$ can be determined using standard methods for solving systems of nonlinear equations.

Another approach for population of the 2D LUT involves the use of spectral reflectance datasets. In this instantiation, knowledge of the spectral response curves on both the input and output side of the transformation is required. RGB values can be computed for both the input and output channels using the following expressions:

$$R_i = \int_0^\infty R_i(\lambda) I(\lambda) \bar{r}(\lambda) d\lambda$$

$$G_i = \int_0^\infty R_i(\lambda) I(\lambda) \bar{g}(\lambda) d\lambda$$

$$B_i = \int_0^\infty R_i(\lambda) I(\lambda) \bar{b}(\lambda) d\lambda \qquad (3)$$

where the index i refers to the i-th reflectance sample. The ratios in equation (2) can then be computed for each of the reflectance samples. For example, for the R channel:

$$\tilde{R}_{train}^i = \frac{R_{out}^i}{\Sigma_{in}^i}$$

Also of importance is calculation of the corresponding p, q coordinates for each reflectance sample i:

$$\Sigma^i = R_{in}^i + G_{in}^i + B_{in}^i \qquad (4)$$

$$p_i = \frac{R_{in}^i}{\Sigma^i}$$

$$q_i = \frac{G_{in}^i}{\Sigma^i}$$

Figure 3:
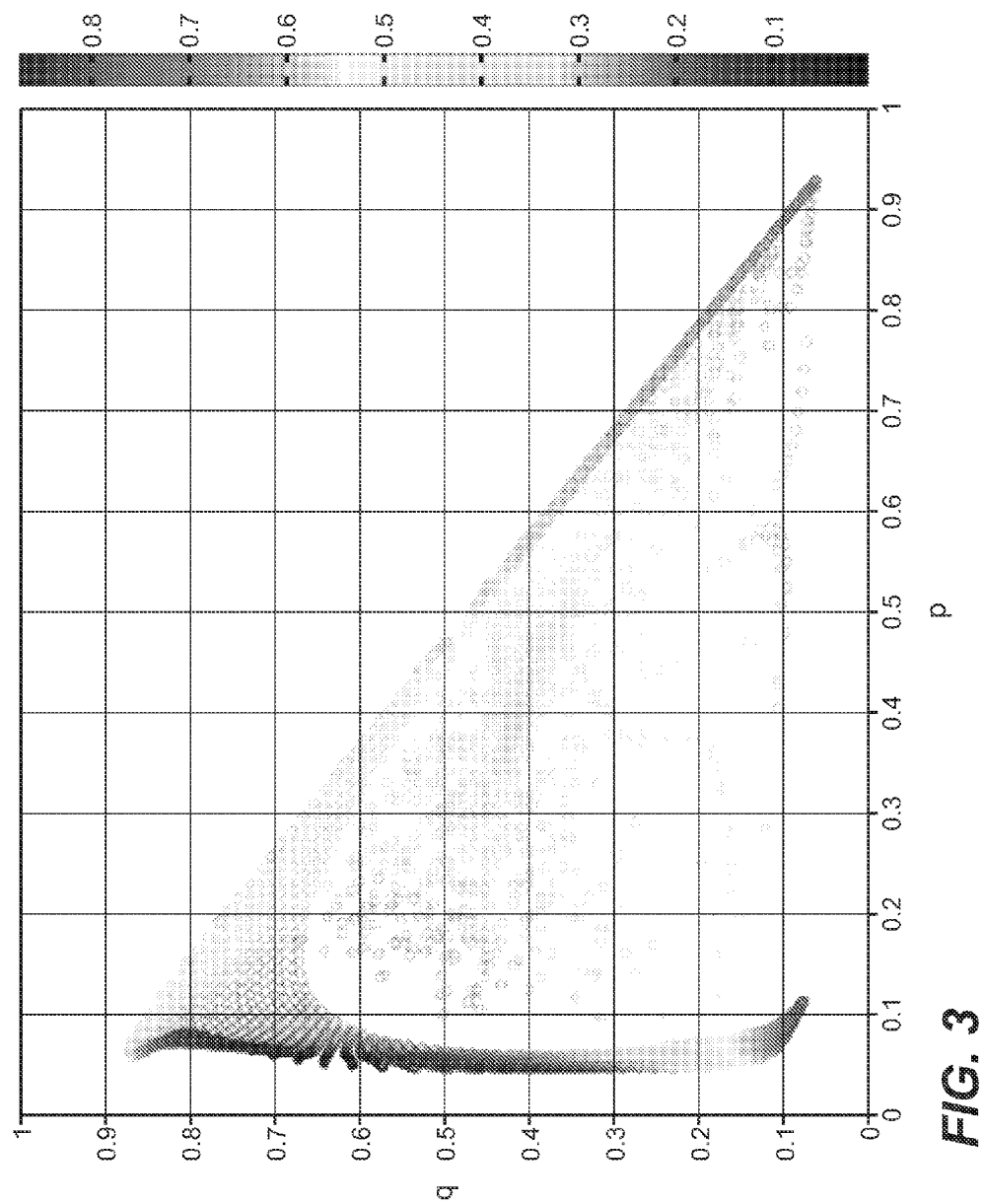
FIG. 3 depicts an example 2-D LUT training surface for the red channel for a digital camera according to an embodiment of the present invention.

An example false color plot of $\tilde{R}_{train}^i$ as a function of $(p_i, q_i)$ is shown in FIG. 3. The color scale refers to the magnitude of the ratio $R_{out}/\Sigma_{in}$. Evidently from the plot, the data can be well approximated by a surface. Although, there are a few samples that show deviation from the average surface, but these fundamentally cannot be avoided due to the different metameric behavior between the input and output camera characteristics.

Figure 4:
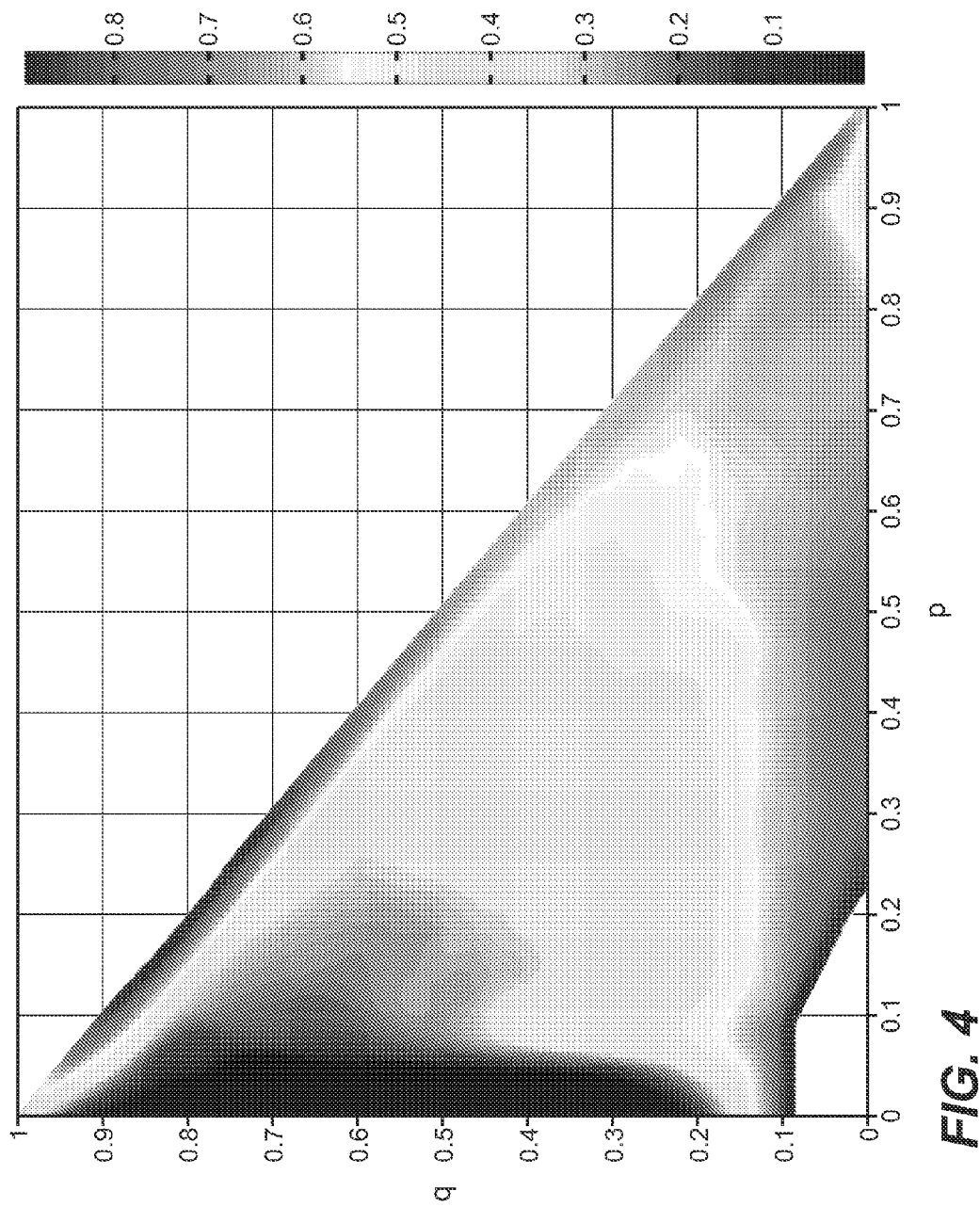
FIG. 4 depicts an example 2-D LUT as generated from the training data according to an embodiment of the present invention.

Obviously, the reflectance dataset creates inhomogeneous spacing in the samples when mapped to (p, q) space, and in some areas does so with high levels of sparseness. From the standpoint of building the 2D LUT, approximating this surface with a regularly spaced sampling grid is required. There are a variety of different 2D regression methods available to achieve this task. For example, one could use two dimensional polynomial functions in (p, q) to represent the surface. Because the training surface (FIG. 3) is not perfectly smooth everywhere, it is necessary to impose a smoothness constraint in the regression algorithm, as there may be a tendency to over fit the training data. FIG. 4 shows an example of the 2D LUT that is generated from FIG. 3, with a LUT size of 525×525.

It should also be noted that the aforementioned 2D LUT structures could be replaced by 2D polynomial functions in (p, q), as described in U.S. patent application Ser. No. 14/039,415. In this case there would be one set of coefficients determined for each channel R, G, B. However, the rest of the data processing depicted in FIG. 2 would remain the same.

Alternative 2-D LUT-Based Embodiments

FIG. 5 depicts an alternate method for utilizing 2D color transformation from camera native (or raw) RGB values (205) to CIE 1931 XYZ color values (512, 522, 532), according to an example embodiment of the present invention. As depicted in FIG. 5, the process has a similar pre-processing step (210) as the one depicted in FIG. 2. Given the computed native chromaticity coordinates (p, q), 2-D LUTs (510) and (520) output the CIE 1931 (x, y) chromaticity coordinates. The (p, q) values are also applied to a third 2-D LUT (530) to generate $\tilde{\Sigma}_{out}$ denoting the ratio $(\Sigma_{out}/\Sigma)$. The output scale factor $\Sigma_{out}$ is computed from $\tilde{\Sigma}_{out}$ by multiplication with the input scale factor $\Sigma$. Once the output scale factor is calculated, final (X, Y) values are determined by simple multiplication of $\Sigma_{out}$ with x and y respectively. Finally, the Z coordinate is computed by subtracting X and Y from $\Sigma_{out}$. Relative to previous 2D color correction methods disclosed, this approach computes the final (X, Y, Z) using an output scale factor that is implicitly a function of the input scale factor.

FIG. 6 depicts another example embodiment of color transformation from input RGB data (205) to target RGB data (e.g., ACES RGB) (640) using an opponent color representation (e.g., HSV), where color pixels are represented using a luma or intensity-like color component and two chroma or color-difference-like components. As opposed to the methods described in FIGS. 2 and 5, the indexing variables to the 2-D LUTs are opponent color representations, for example (H, S) from the HSV representation. The forward and reverse transformations from RGB to HSV are well known, and can be thought of as a cylindrical representation. Again, the $(H_{in}, S_{in})$ coordinates are used to index into two separate 2D LUTs (610, 620) to produce the output $(H_{out}, S_{out})$ values. Importantly, the ratio of $(\tilde{V}_{out} = V_{out}/V_{in})$ is also computed from a third 2D LUT/function that is indexed using the input $(H_{in}, S_{in})$, and when multiplied by $V_{in}$ produces an estimate of $V_{out}$. Adobe Systems has introduced the use of 2-D LUTs in color transforms in their DNG specification (Ref. [5]), but a significant difference is that a 2-D LUT is not used for the V channel transformation and correction.

The process for building the LUT for the Sigma ($\Sigma_{out}$) or V channel (e.g., 530 and 630) may be similar the procedure outlined earlier. For example, given a reflectance training set, the $\Sigma_{out}$ and $\Sigma$ values may be computed, since the spectral response information is known for both. Then one may compute the $\Sigma_{out}/\Sigma$ values as well as their corresponding (p, q) values. This should more or less define a surface, similar to the one shown in FIG. 3, that may be sparse in some areas. The LUT is formed by approximating this surface at the regularly-spaced node positions of the LUT. This is analogous to FIG. 4. A similar procedure may be used in generating LUT (630) for $\tilde{V}_{out}=V_{out}/V_{in}$, except the indexing coordinates are ($H_{in}$, $S_{in}$).

As indicated previously, the 2D LUT entities illustrated in FIGS. 5 and 6 can be replaced by two dimensional polynomial functions in (p, q) or (H, S).

It is noted, that a person skilled in the art will appreciate that the transformation process depicted in FIG. 6 may utilize any opponent color representation, such as HSI, YCbCr, and the like.

Figure 7A:
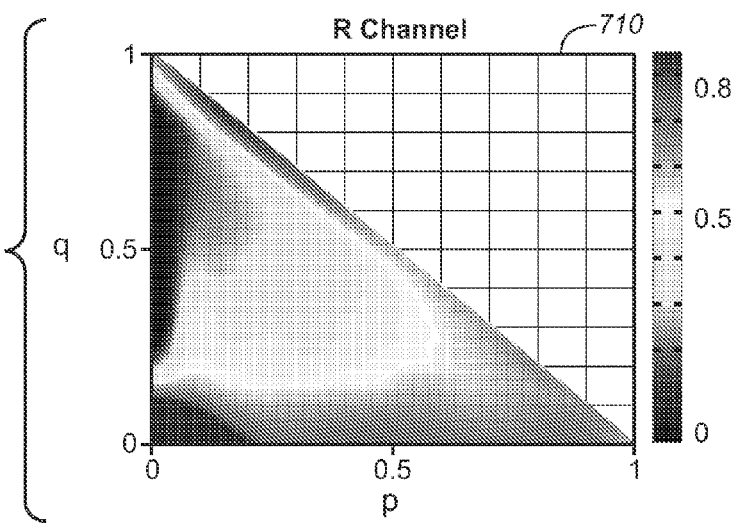
FIG. 7A-7C depict 2-D LUTs for R, G, and B raw to RGB ACES transformation according to an example embodiment of the present invention.
Figure 7B:
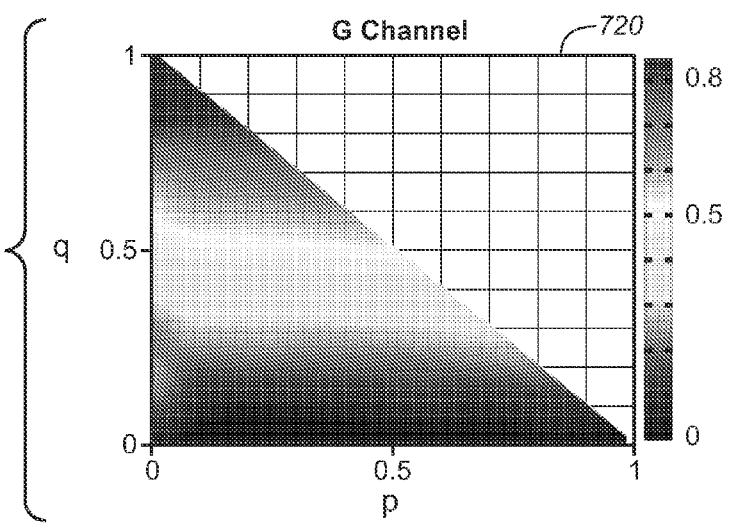
Figure 7C:
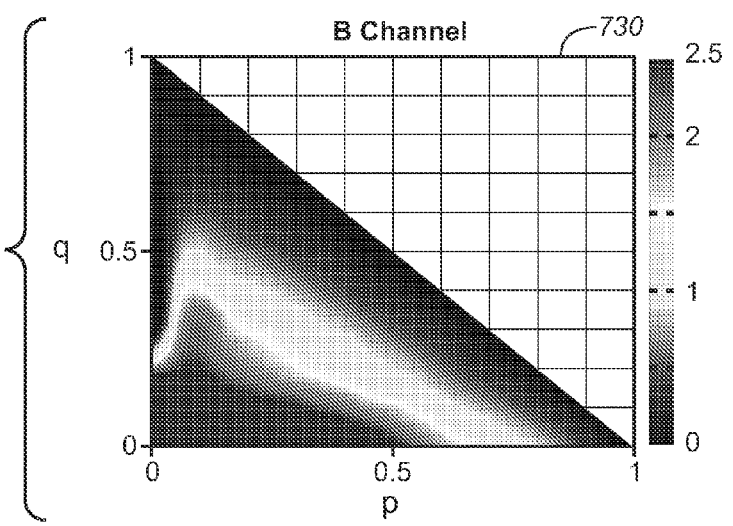
Figure 8:
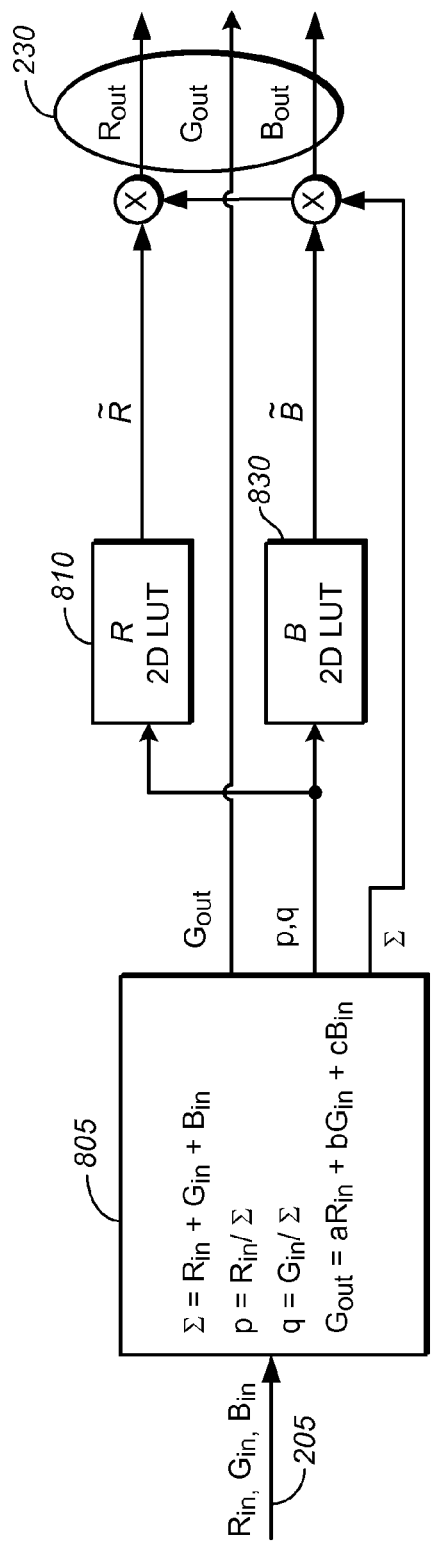
FIG. 8 depicts method for utilizing 2-D color transformations from camera native values to RGB according to an example embodiment of the present invention.

Referring to FIG. 5, a 2D transform is specified for each of the output R, G, B channels. However, in some cases one of the output channels may be well-correlated with the input scale factor ($\Sigma$). As an example, FIGS. 7A-7C depict 2D LUT surfaces for a camera transformation from RGB native to ACES RGB. It is clear that the Red (710) and Blue channel LUTs (730) have somewhat complex surfaces. However the Green channel LUT (720) is well-approximated by a planar surface, which indicates $G_{out}$ has a high correlation with $\Sigma$. With this realization, the output green channel may be thus computed as a simple linear combination of the input R, G, B signals (instead of using a 2D LUT for that channel):

$$G_{out}=a*R_{in}+b*G_{in}+c*B_{in}, \quad (5)$$

where a, b, and c are coefficients that define the planar surface. Based on equation (5), in an embodiment, the color transformation process of FIG. 2 could be simplified as depicted in FIG. 8, whereby the output G signal ($G_{out}$) is computed in (805), in addition to computing the (p, q) and the scale factor ($\Sigma$). This embodiment trade-offs some additional pre-processing in (805) (computing equation (5)), for one less LUT (eliminating the Green LUT). A similar approach may also be followed when applying 2-D color transformation techniques to other color spaces.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to color transformations using two-dimensional transforms for camera color correction, such as those described herein. The computer and/or IC may compute any of a variety of parameters or values that relate to the color transformations using two-dimensional transforms for camera color correction described herein. The image and video embodiments may be implemented in hardware, software, firmware and various combinations thereof.

Certain implementations of the invention comprise computer processors which execute software instructions which cause the processors to perform a method of the invention. For example, one or more processors in a camera, display, an encoder, a set top box, a transcoder or the like may implement methods related to color transformations using two-dimensional transforms for camera color correction as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to color transformations using two-dimensional transforms for camera color correction are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

REFERENCES

1. SMPTE ST 2065-1:2012 and SMPTE ST 2065-4:2013, Academy Color Encoding Specification (ACES).
2. R. Luther, "Aus dem Gebiet der Farbreizmetrik," Zeitschrift für technische Physik 8, 540 (1927).
3. G. Finlayson, and M. Drew, White-Point Preserving Color Correction, Proc. IS&T Fifth Color Imaging Conference, pg. 258. (1997).
4. P. Hubel, J. Holm, G. Finlayson, and M. Drew, Matrix Calculations for Digital Photography, Proc. IS&T Fifth Color Imaging Conference, pg. 105. (1997).
5. Digital Negative (DNG) Specification, v. 1.3.0.0, June 2009, Adobe. (Available from https://www.adobe.com/content/dam/Adobe/en/products/photoshop/pdfs/dng_spec.pdf)

The invention claimed is:

1. A method to generate color output signals in response to input signals from an image capture device, the method comprising:
receiving first, second, and third input signals from the image capture device;
generating an input scale factor (Σ) in response to the input signals;
generating first and second chromaticity signals (p, q) in response to the input signals;
mapping the first and second chromaticity signals to first and second preliminary color signals (x, y), wherein the mapping involves two-dimensional transformation of the first and second chromaticity signals to the first and second preliminary color signals respectively;
mapping the first and second chromaticity signals to a preliminary scale factor ($\tilde{\Sigma}_{out}$), wherein the mapping involves a two-dimensional transformation of the first and second chromaticity signals to the preliminary scale factor;
generating an output scaling factor ($\tilde{\Sigma}_{out}$) by multiplying the preliminary scale factor with the input scale factor; and
generating a set of output color signals (X, Y, Z) in response to the output scaling factor and the first and second preliminary color signals.

2. A method to generate color output signals in response to input signals from an image capture device, the method comprising:
receiving first, second, and third input signals from the image capture device;
generating an input scale factor (Σ) in response to the input signals;
generating first and second chromaticity signals (p, q) in response to the input signals;
generating a first output color signal ($G_{out}$) as a linear combination of the input signals;
mapping the first and second chromaticity signals to first and second preliminary color signal ($\tilde{R}$), ($\tilde{B}$), wherein the mapping involves a two-dimensional transformation of the first and second chromaticity signals to the first and second preliminary color signals, respectively;
generating a second output color signal by multiplying the first preliminary color signal color signal with the input scale factor (Σ); and
generating a third output color signal by multiplying the second preliminary color signal with the input scale factor (Σ).

3. The method of claim 1, wherein the first and second preliminary color signals (x, y) correspond to an output of a 2D lookup table (LUT) indexed by the first and second chromaticity signals, respectively.

4. The method of claim 1, wherein the first, second, and third input signals correspond to Red, Green, and Blue signals.

5. The method of claim 1, wherein generating the input scale factor comprises adding together the first, second, and third input signals.

6. The method of claim 1, wherein generating the first and second chromaticity signals comprises:
dividing the first input signal with the input scale factor to generate the first chromaticity signal; and
dividing the second input signal with the input scale factor to generate the second chromaticity signal.

7. The method of claim 1, wherein the first and second preliminary color signals correspond to the CIE x and y signals and the set of output color signals corresponds to the CIE X, Y, and Z signals.

8. The method of claim 7, wherein the X output color signal is generated by multiplying the first (x) preliminary color signal with the output scale factor, and the Y output color signal is generated by multiplying the second (y) preliminary color signal with the output scale factor.

9. The method of claim 8, further comprising, generating the Z output signal by subtracting the X signal and the Y signal from the output scale factor.

10. The method of claim 1, wherein the first and second chromaticity signals comprise first and second color-difference values of the first, second, and third input signals in an opponent color space, and the input scale factor comprises a luma value of the first, second, and third raw output signals in the opponent color space.

11. The method of claim 10, wherein the first and second chromaticity signals comprise H and S values of the first, second, and third input signals in the HSV color space, and the input scale factor comprises a V value of the first, second, and third raw output signals in the HSV color space.

12. The method of claim 11, wherein the set of output color signals comprise R, G, and B values, wherein generating the RGB output color values comprises mapping the output scaling factor and the first and second preliminary color signals to the RGB output values using an HSV to RGB color transformation.

13. The method of claim 11, wherein the RGB values are ACES RGB values.

14. The method of claim 3, wherein the 2D LUT is designed using input and output signals derived from spectral reflectance data.

15. The method of claim 3, wherein generating the 2D lookup (LUT) table further comprises:
generating output values of the LUT mapping function in response to a reflectance training data set;
generating input index values for the LUT mapping function in response to the reflectance training data set;
generating a surface based on the generated input index values and the output values of the LUT mapping function; and
generating the 2D LUT values by approximating according to an approximation criterion the generated surface at a regularly sampled grid.

16. The method of claim 1, wherein the input signals correspond to red (R), green (G), and blue (B) signals and the first output color signal corresponds to a Green color output signal.

17. An apparatus comprising a processor and configured to perform the method recited in claim 1.

18. A non-transitory computer-readable storage medium having stored thereon computer-executable instruction for executing a method with a computer in accordance with the claim 1.

* * * * *